United States Patent
Biswas et al.

(10) Patent No.: US 11,232,266 B1
(45) Date of Patent: Jan. 25, 2022

(54) SYSTEMS AND METHODS FOR GENERATING A SUMMARY OF A MULTI-SPEAKER CONVERSATION

(71) Applicant: Verizon Patent and Licensing Inc., Basking Ridge, NJ (US)

(72) Inventors: Pratik K. Biswas, Morganville, NJ (US); Aleksandr Iakubovich, Plano, TX (US)

(73) Assignee: Verizon Patent and Licensing inc., Basking Ridige, NJ (US)

( * ) Notice: Subject to any disclaimer, the term of this patent is extended or adjusted under 35 U.S.C. 154(b) by 0 days.

(21) Appl. No.: 17/133,127

(22) Filed: Dec. 23, 2020

Related U.S. Application Data

(63) Continuation-in-part of application No. 16/939,800, filed on Jul. 27, 2020.

(51) Int. Cl.
| | |
|---|---|
| *G06F 40/35* | (2020.01) |
| *G06F 40/253* | (2020.01) |
| *G10L 15/26* | (2006.01) |
| *G06F 16/31* | (2019.01) |
| *H04M 3/22* | (2006.01) |
| *G06F 40/289* | (2020.01) |
| *G06F 16/36* | (2019.01) |

(52) U.S. Cl.
CPC ............ *G06F 40/35* (2020.01); *G06F 16/313* (2019.01); *G06F 40/253* (2020.01); *G06F 40/289* (2020.01); *G10L 15/26* (2013.01); *G06F 16/36* (2019.01); *H04M 3/2218* (2013.01)

(58) Field of Classification Search
CPC .............. H04M 3/5183; H04M 3/5175; H04M 3/2218; G06Q 30/0281; G06F 40/35; G06F 16/313; G06F 40/253; G10L 15/26

USPC ...... 379/266.1, 265.11, 265.05, 265.01, 242, 379/265.02, 265.03
See application file for complete search history.

(56) References Cited

U.S. PATENT DOCUMENTS

| | | | |
|---|---|---|---|
| 9,167,095 B1 * | 10/2015 | Selvin ................. | H04M 3/5175 |
| 10,623,572 B1 * | 4/2020 | Copeland ............ | G06Q 30/016 |
| 10,735,585 B1 | 8/2020 | Johnston | |

(Continued)

OTHER PUBLICATIONS

Muller, "Bert Extractive Summarizer," pypi v0.7.1, Licensed by MIT, 2021, [retrieved from https://pypi.org/project/bert-extractive-summarizer/].

(Continued)

*Primary Examiner* — Thjuan K Addy

(57) ABSTRACT

A system may separate a transcript of a conversation into a first section corresponding to a first speaker in the conversation, and a second section corresponding to a second speaker in the conversation. The system may process, based on delimiters and punctuation marks, the first section and the second section to form a first speaker transcript and a second speaker transcript; determine, based on one or more topic models, a first set of key terms associated with the first speaker transcript and a second set of key terms associated with the second speaker transcript. The system may generate, based on a common set of key terms associated with the first set and the second of key terms, a first transcript summary of the first speaker transcript and a second transcript summary of the second speaker transcript; and generate a summary based on the first and the second transcript summaries.

20 Claims, 8 Drawing Sheets

(56) References Cited

U.S. PATENT DOCUMENTS

| | | |
|---|---|---|
| 2009/0097634 A1 | 4/2009 | Nambiar et al. |
| 2021/0027772 A1 | 1/2021 | Horev et al. |
| 2021/0201238 A1* | 7/2021 | Sekar .................. G06Q 30/016 |

OTHER PUBLICATIONS

Allahyari et al., "Text Summarization Techniques: A Brief Survey," Computing Research Repository, 2017, arXiv: 1707.02268v3, 9 pages.

Blei et al., "Latent Dirichlet Allocation," The Journal of Machine Learning Research 3, 2003, pp. 993-1022.

Bookstein et al., "Detecting Content-Bearing Words by Serial Clustering—Extended Abstract," In Proceedings of the 18th ACM-SIGIR Conference, 1995, pp. 319-327.

Brandow et al., "Automatic condensation of electronic publications by sentence selection," Information Processing and Management, vol. 31, Issue 5, Sep. 1995, 8 pages.

Cer et al., "Universal Sentence Encoder," Computing Research Repository, 2018, arXiv: 1803.11175v2, 7 pages.

Chen et al., "An approach to sentence-selection-based text summarization," 2002 IEEE Region 10 Conference on Computers, Communications, Control and Power Engineering. TENCOM '02. Proceedings., Beijing, China, Vol. 1, 2002, pp. 489-493.

Conroy et al., "Text summarization via hidden markov models," Proceedings of the 24th annual international ACM SIGIR conference on Research and development in information retrieval, Sep. 2001, pp. 406-407.

Deerwester at al., "Indexing by Latent Semantic Analysis," Journal of the American Society for Information Science, vol. 41, Issue 6, 1990, pp. 391-407.

Devlin, "Bert: Pre-training of Deep Bi-Directional Transformers for Language Understanding," Computing Research Repository, May 24, 2019, arXiv: 1810.04805v2, 16 pages.

Edmundson, "New Methods in Automatic Extracting," Journal of the Association for Computing Machinery, vol. 16, No. 2, Apr. 1969, pp. 264-285.

Erkan et al., "LexRank: Graph-based Lexical Centrality as Salience in Text Summarization," Journal of Artificial ntelligence Research, vol. 22, 2004, pp. 457-479.

Fattah et al., "Automatic Text Summarization," International Journal of Electrical and Computer Engineering, Feb. 2008, pp. 25-28.

Gaikwad et al., "A Review Paper on Text Summarization," International Journal of Advanced Research in Computer and Communication Engineering, vol. 5, Issue 3, 2016, pp. 154-160.

Gong et al., "Generic text summarization using relevance measure and latent semantic analysis," SIGIR '01 Proceedings of the 24th Annual International ACM SIGIR Conference on Research and Development in Information Retrieval, Sep. 2001, pp. 19-25.

Gupta et al., "A Survey of Text Summarization Extractive Techniques," Journal of Emerging Technologies in Web Intelligence, vol. 2, No. 3, Aug. 2010, pp. 258-268.

Jezek et al., "Automatic Text Summarization," Vaclav Snasel (Ed.): Znalosti 2008, pp. 1-12.

Jones, "Automatic summarizing: The state of the art," Information Processing & Management, vol. 43, No. 6, 2007, 52 pages.

Khan et al., "A Review on Abstractive Summarization Methods," Journal of Theoretical and Applied Information Technology, 2014, vol. 59, No. 1, pp. 64-72.

Kaikhah, "Automatic Text Summarization with Neural Networks," In Proceedings of Second International Conference on Intelligent Systems, IEEE, 2004, Texas, USA, pp. 40-44.

Kupiec et al., "A Trainable Document Summarizer," In Proceedings of the 18th ACMSIGIR Conference, 1995, pp. 38-73.

Lemberger, "Deep Learning Models for Automatic Summarization," Computing Research Repository, May 2020, 13 pages.

Lin, "Rouge: A Package for Automatic Evaluation of Summaries," In Text Summarization Branches Out: Proceedings of the ACL-04 Workshop, 2004, pp. 74-81.

Lin et al., "Abstractive Summarization: A Survey of the State of the Art," In the Proceedings of the AAAI Conference on Artificial Intelligence, 2019, 8 pages.

Liu et al., "Fine-tune BERT for Extractive Summarization," Computing Research Repository, Sep. 2019, 6 pages.

Liu et al., "Text Summarization with Pretrained Encoders," In proceedings of EMNLP-IJCNLP, Sep. 2019, pp. 3730-3740.

Luhn, "The Automatic Creation of Literature Abstracts," IBM Journal of Research and Development, vol. 2, No. 2, 1958, pp. 159-165.

Miller, "Leveraging BERT for Extractive Text Summarization on Lectures," Computing Research Repository, 2019, 7 pages.

Mittendorf, "Document and Passage Retrieval Based on Hidden Markov Models," SIGIR '94: Proceedings of the 17th Annual International ACM SIGIR Conference on Research and Development in Information Retrieval, Aug. 1994, pp. 318-327.

Nallapati et al., "SummaRuNNer: A Recurrent Neural Network based Sequence Model for Extractive Summarization of Documents," In Proceedings of the 31st AAAI Conference on Artificial Intelligence. San Francisco, CA, USA, 2016, pp. 3075-3081.

Nallapati et al., "Abstractive Text Summarization using Sequence-to-sequence RNNs and Beyond," In Proceedings of the 20th SIGNLL Conference on Computational Natural Language Learning, Berlin, Germany, 2016, pp. 280-290.

Narayan et al., "Ranking Sentences for Extractive Summarization with Reinforcement Learning," In Proceedings of NAACL-HLT, 2018, pp. 1747-1759.

Neto, "Automatic Text Summarization using a Machine Learning Approach," Advances in Artificial Intelligence Lecture Notes in Computer Science, Springer Berlin / Heidelberg, vol. 2507, 2002, pp. 205-215.

Nenkova, "A Survey of Text Summarization Techniques," Mining Text Data, Springer, 2012, pp. 43-76.

Paulus et al., "A Deep Reinforced Model for Abstractive Summarization," 2017, 12 pages.

Radev, "Introduction to the Special Issue on Summarization," Association for Computational Linguistics, vol. 28, No. 4, 2002, pp. 399-408.

Reeve, "Concept Frequency Distribution in Biomedical Text Summarization," ACM 15th Conference on Information and Knowledge Management (CIKM), Arlington, VA, 2006, 10 pages.

Rumelhart et al., "Learning representations by back-propagating errors," Nature, vol. 323, No. 9, Oct. 1986, pp. 533-536.

Saggion et al., "Automatic Text Summarization: Past, Present and Future," Multi-source, Multilingual Information Extraction and Summarization. Springer, 2013, 20 pages.

Saranyamol, "A Survey on Automatic Text Summarization," International Journal of Computer Science and Information Technologies, vol. 5, Issue 6, 2014, pp. 7889-7893.

See et al., "Get To The Point: Summarization with Pointer-Generator Networks," Computing Research Repository, 2017, 20 pages.

Steyvers et al., "Probabilistic Topic Models," Handbook of Latent Semantic Analysis, 2007, pp. 424-440.

Suanmali et al., "Fuzzy logic based method for improved text summarization," (IJCSIS) International Journal of Computer Science and Information Security, vol. 2, No. 1, 2009, 6 pages.

Vaswani et al., "Attention Is All You Need," 31st Conference on Neural Information Processing Systems (NIPS 2017), Long Beach, CA, 15 pages.

Verma et al., "Extractive Summarization using Deep Learning," Computing Research Repository, 2019, 11 pages.

Wang et al., "Multi-Document Summarization using Sentence-based Topic Models," In Proceedings of the ACL-JCNLP Conference Short Papers, Suntec, Singapore, 2009, pp. 297-300.

Wu et al., "Extracting Summary Knowledge Graphs from Long Documents," Computing Research Repository, 2020, 8 pages.

Xu et al., "Neural Extractive Text Summarization with Syntactic Compression," In proceedings of EMNLP-IJCNLP, 2019, pp. 3292-3303.

Zechner, "A Literature Survey on Information Extraction and Text Summarization," Computational Linguistics Program, Carnegie Mellon University, Apr. 14, 1997, 31 pages.

(56) References Cited

OTHER PUBLICATIONS

Zhong et al., "Extractive Summarization as Text Matching," In proceedings of 58th Annual Meeting of ACL, 2020, pp. 6197-6208.
Biswas et al., "Extractive Summarization of Call Transcripts," AI & Data Science, Global Network and Technology, Verizon Communications, New Jersey, USA, 2020, 10 pages.

* cited by examiner

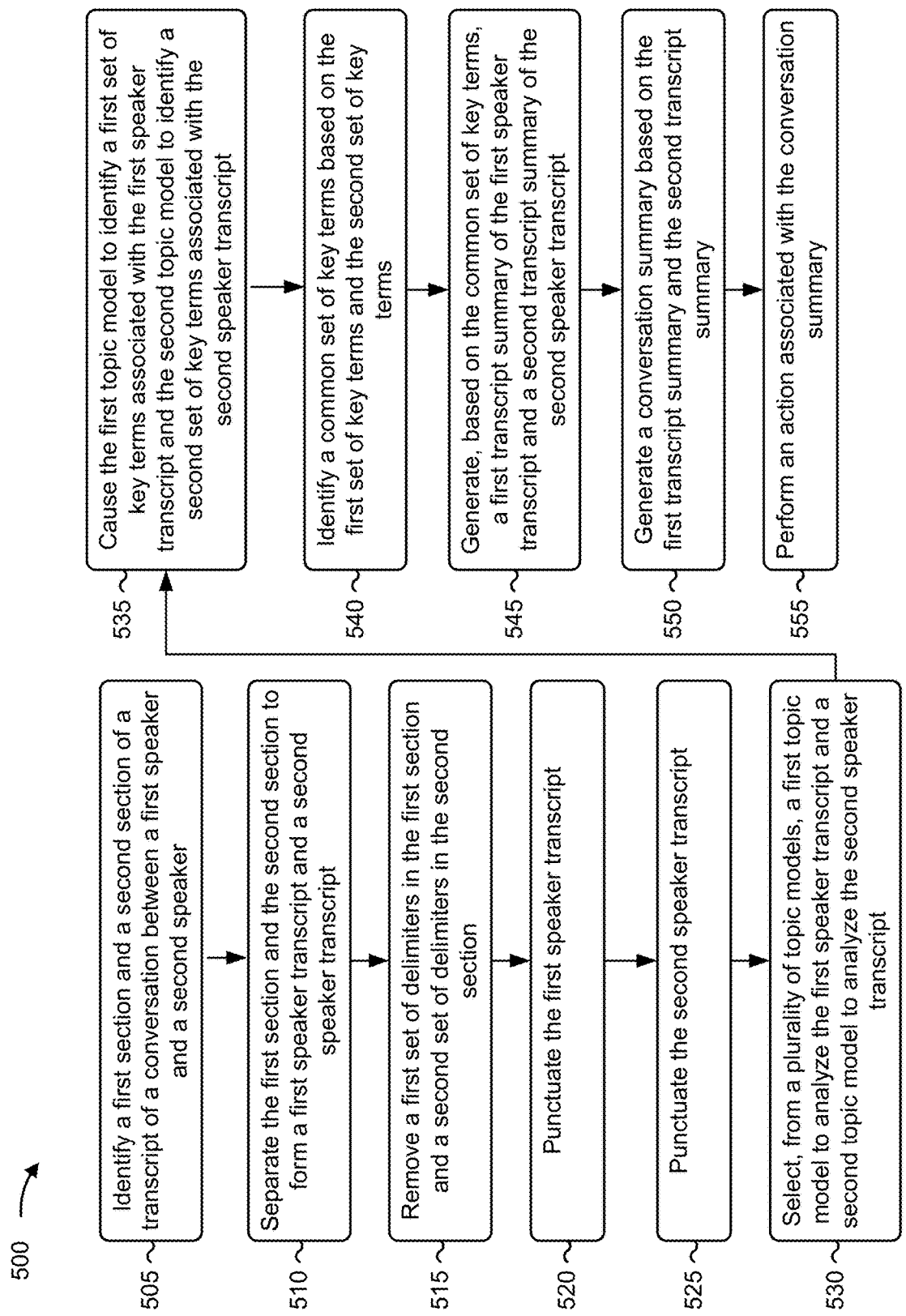

SYSTEMS AND METHODS FOR GENERATING A SUMMARY OF A MULTI-SPEAKER CONVERSATION

CROSS-REFERENCE TO RELATED APPLICATION

This application is a continuation-in-part (CIP) of U.S. patent application Ser. No. 16/939,800, filed on Jul. 27, 2020 and entitled "METHOD AND APPARATUS FOR SUMMARIZATION OF DIALOGS," the content of which is incorporated by reference herein in its entirety.

BACKGROUND

A customer service representative may engage in a conversation with a customer for the purpose of providing customer service. Interactions between the customer service representative and the customer, during the conversation, may be analyzed to improve customer service. For example, a transcript of the conversation may be analyzed for the purpose of improving customer service.

BRIEF DESCRIPTION OF THE DRAWINGS

FIG. 5 is a flowchart of an example process associated with systems and methods for generating a summary of a multi-speaker conversation.

DETAILED DESCRIPTION OF PREFERRED EMBODIMENTS

Figure 1A:
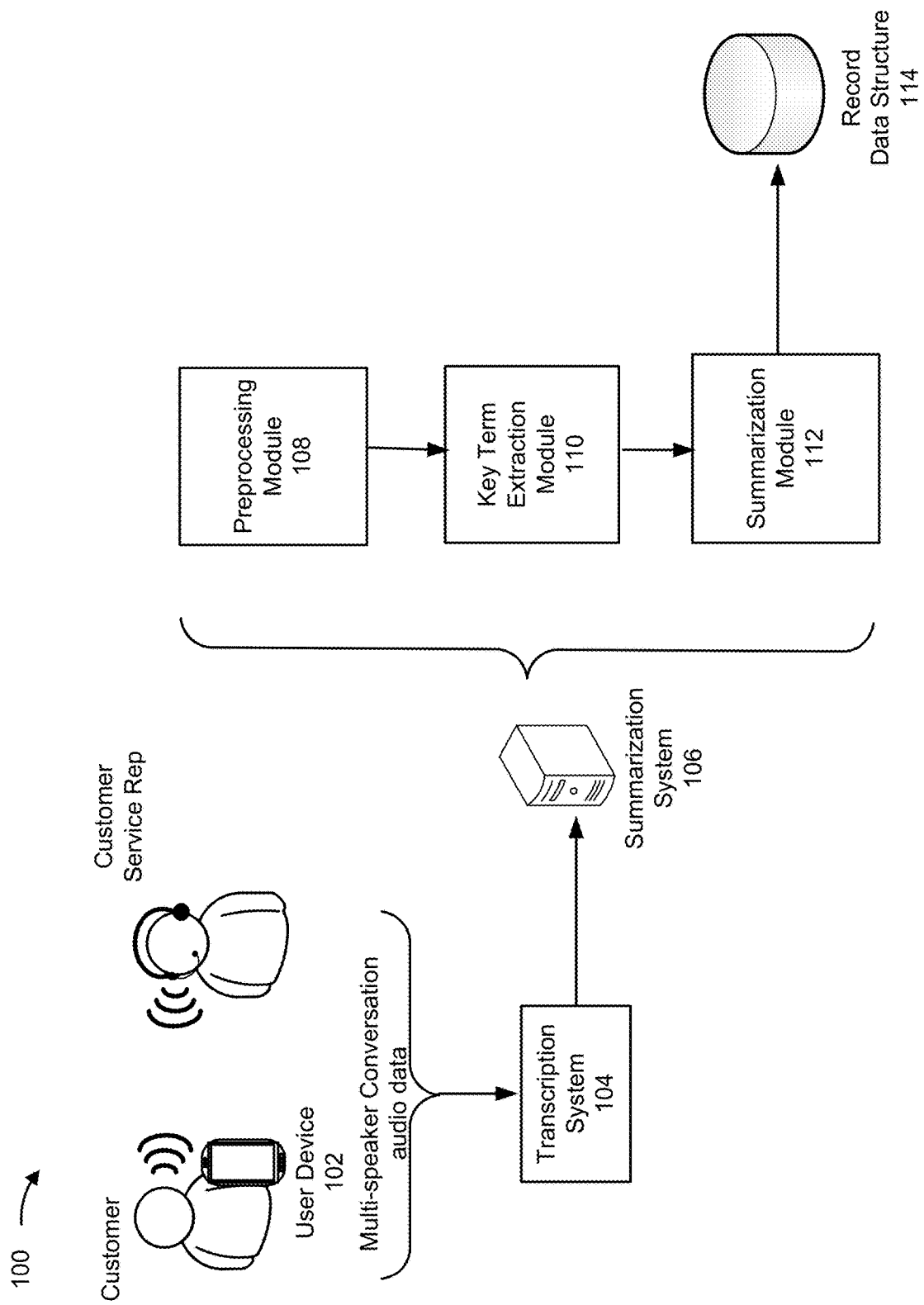
FIGS. 1A-1D are diagrams of an example associated with generating a summary of a multi-speaker conversation.

The following detailed description of example implementations refers to the accompanying drawings. The same reference numbers in different drawings may identify the same or similar elements.

A first individual and a second individual may engage in a conversation (e.g., an in-person conversation, a telephone conversation, a videoconference conversation, among other examples). Upon completion of the conversation, a transcript of the conversation may be generated. As an example, a customer and a customer service representative may engage in a conversation (e.g., an in-person conversation, a telephone conversation, a videoconference conversation, among other examples). Upon completion of the conversation between the customer and the customer service representative, one or more computing devices may be used to generate a transcript of the conversation between the customer and the customer service representative. The transcript may be subject to several issues. For example, the transcript may be lengthy (thereby creating an information overload for a recipient of the transcript). Additionally, or alternatively, the transcript may be improperly punctuated or not punctuated (thereby creating confusion for the recipient of the transcript). Additionally, or alternatively, the transcript may include subject matter that is irrelevant and/or that are grammatically incorrect (thereby creating confusion for the recipient of the transcript).

Some implementations described herein relate to a summarization system that generates a summary of a transcript (of a conversation between multiple speakers) by generating a summary of a respective portion of the transcript corresponding to a respective speaker of the multiple speakers. For example, the summarization system may receive, from a transcription system, a transcript of a conversation between a first speaker and a second speaker. The summarization system may identify a first section of the transcript that corresponds to speech of the first speaker and a second section of the transcript that corresponds to speech of the second speaker. In some implementations, the summarization system may use a modified Bidirectional Encoder Representations from Transformers (BERT) model (for speaker identification) to identify the first section and the second section. The summarization system may identify and remove a first set of delimiters in the first section and a second set of delimiters in the second section. The summarization system may punctuate the first speaker transcript based on the first set of punctuations marks and punctuate the second speaker transcript based on the second set of punctuation marks. In some implementations, the summarization system may punctuate the first speaker transcript and the second speaker transcript using a modified BERT model (for punctuation restoration). The summarization system may generate a first speaker transcript from the first section and a second speaker transcript from the second section. The summarization system may determine, based on a first topic model, a first set of key terms associated with the first speaker transcript and determine, based on a second topic model, a second set of key terms associated with the second speaker transcript.

The summarization system may generate, based on the first set of key terms and the second set of key terms, a first transcript summary of the first speaker transcript and a second transcript summary of the second speaker transcript. The summarization system may generate a conversation summary based on the first transcript summary and the second transcript summary. The summarization system may perform an action associated with the conversation summary. By processing the transcript to generate the first transcript summary of the first speaker transcript and the second transcript summary of the second speaker transcript as described above, the summarization system conserves computing resources, networking resources, and/or other resources that would have otherwise been wasted when generating call transcripts that are lengthy, that are improperly punctuated or not punctuated, and/or that include sentences that are irrelevant and/or grammatically incorrect.

FIGS. 1A-1D are diagrams of an example 100 associated with generating a summary of a multi-speaker conversation. As shown in FIG. 1A, example 100 includes a user device 102, a transcription system 104, and a summarization system 106. The summarization system 106 may include a preprocessing module 108, a key term extraction module 110, and a summarization module 112. The summarization system 106 may be associated with a record data structure 114. The user device 102, the transcription system 104, and the summarization system 106 are described in more detail below in connection with FIG. 3.

The user device 102 may include a stationary device or a mobile user device. The transcription system 104 may include a server device or a collection of server devices (e.g., associated with a cloud computing environment or a data center) that generate transcriptions of conversations between multiple speakers. In this regard, the transcription system 104 may include speech-to-text capabilities. The conversations may include telephone conversations, video conference conversations, and/or in-person conversations.

The summarization system 106 may include a single device or a collection of devices that generates summaries of multi-speaker conversations. As explained above, the summarization system 106 may include the preprocessing module 108, the key term extraction module 110, and the summarization module 112. The preprocessing module 108, the key term extraction module 110, and the summarization module 112 may be used to generate summaries of multi-speaker conversations, as described in more detail below. The modules of the summarization system 106 described herein are merely provided as an example. In practice, there may be additional modules, fewer modules, different modules, or differently arranged modules than those shown in FIGS. 1A-1D. Additionally, or alternatively, a set of modules (e.g., one or more modules) shown in FIGS. 1A-1D may perform one or more functions described as being performed by another set of modules shown in FIGS. 1A-1D.

The record data structure 114 may include a data structure (e.g., a database, a table, and/or a linked list) that stores information regarding summaries of multi-speaker conversations generated by the summarization system 106. In operation, the summarization system 106 may receive the transcriptions (of the conversations) generated by the transcription system 104 and may generate summaries of the transcriptions. In some implementations, the summarization system 105 may include a transcription system (e.g., the transcription system 104) and may generate the transcriptions. The summarization system 106 may provide copies of a portion of the summaries of the transcriptions to the user device 102 and/or to the record data structure 114 for storage.

In the description to follow and merely as an example, a customer may use the user device 102 to engage in a multi-speaker conversation (e.g. a telephone conversation) with a customer service representative. Audio data of the multi-speaker conversation may be provided to the transcription system 104 to cause the transcription system 104 to generate a transcription (e.g., a textual description) of the multi-speaker conversation. While the description refers to a telephone conversation between two speakers, the description is applicable to a conversation (e.g., a telephone conversation, a video conference conversation, and/or an in-person conversation) between more than two speakers.

Figure 1B:
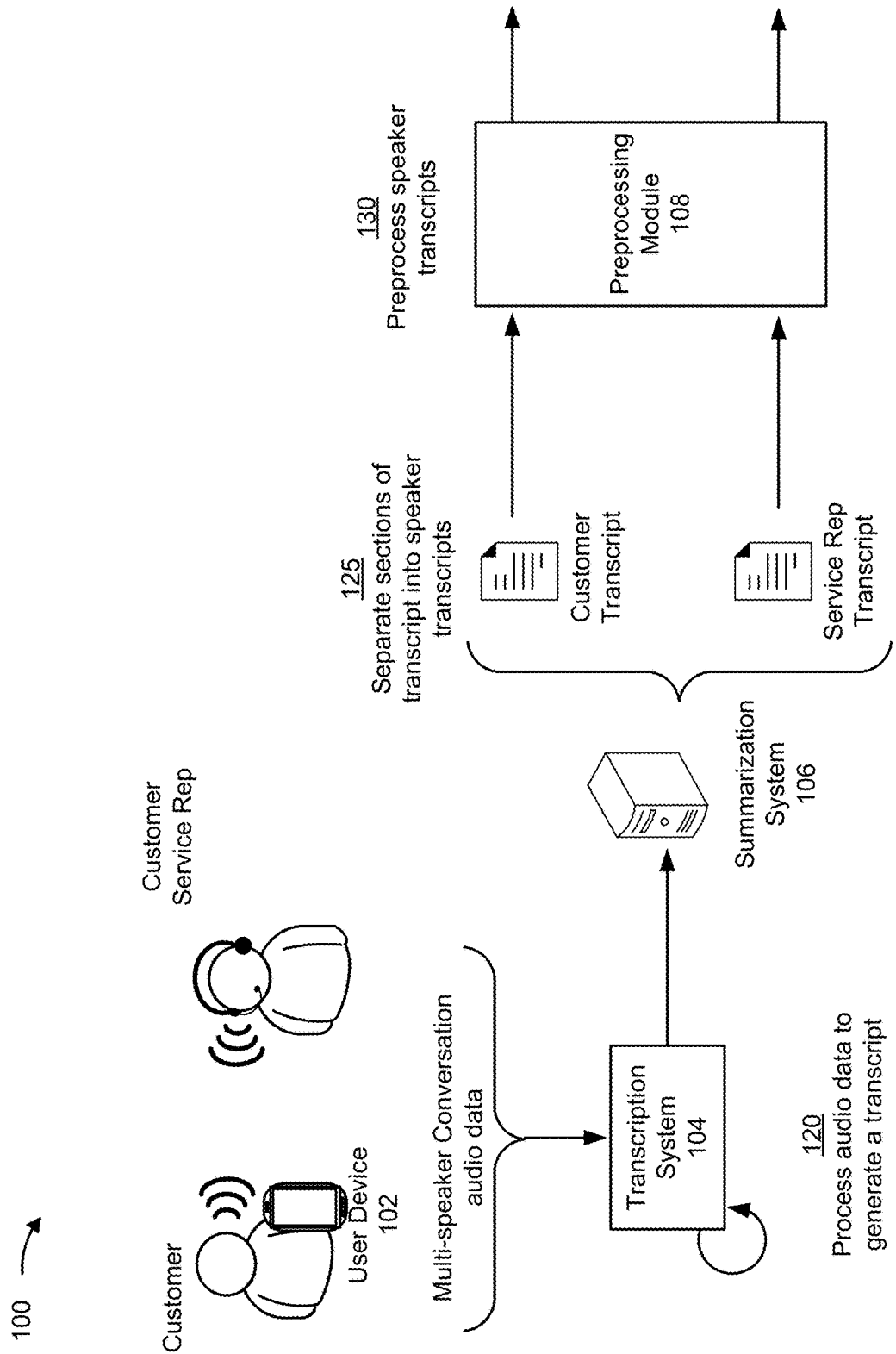

As shown in FIG. 1B, and by reference number 120, the transcription system 104 may process the audio data to generate a transcript. For example, the transcription system 104 may receive a transcription request to transcribe the telephone conversation and process the audio data (of the telephone conversation) to generate the transcript. In some implementations, the transcription system 104 may receive the transcription request from a device (e.g., a device of the customer service representative). Additionally, or alternatively, the transcription system 104 may receive the transcription request from another device (e.g., the summarization system 106 and/or a device associated with the record data structure 114). The transcription request may include customer information identifying the customer. The customer information may include a name of the customer, an address of the customer, a telephone number associated with the user device 102, a network address associated with the user device 102, an instant message identifier associated with the customer, an e-mail address associated with the customer, and/or other information identifying the customer.

The transcription system 104 may process the audio data (of the multi-speaker conversation) to generate the transcript. In some implementations, the transcription system 104 may include a speech-to-text generator that converts the audio data of the multi-speaker conversation (e.g., speech from the audio data) into text. In some examples, the text may be annotated with information identifying a first speaker (e.g., the customer) and information identifying a second speaker (e.g., the customer service representative/agent). In some instances, the transcript may include punctuation (e.g., punctuation marks), mostly as delimiters based on user perception (e.g., perception of an annotator) of pauses in the conversation. Alternatively, the transcript may not include punctuation.

In some implementations, the transcription system 104 may generate the transcript in real time during the conversation between the first speaker and the second speaker. In some implementations, the transcription system 104 may generate the transcript based on an event. The event may include detection of a termination of the conversation between the first speaker and the second speaker, receipt of a request to generate the transcript from another device, detection of the audio data being uploaded to the transcription system 104, among other examples.

As shown in FIG. 1B, and by reference number 125, the summarization system 106 may separate sections of the transcript into separate speaker transcripts. For example, the summarization system 106 may receive (e.g., from the transcription system 104) a summarization request to generate a conversation summary of the transcript. For instance, after generating the transcript, the transcription system 104 may transmit the summarization request to the summarization system 106. In some implementations, the summarization request may include the transcript and the customer information. The summarization system 106 may identify (e.g., based on the information identifying the first speaker) a first section of the transcript that corresponds to speech of the first speaker (e.g., the customer) and identify (e.g., based on the information identifying the second speaker) a second section of the transcript that corresponds to speech of the second speaker (e.g., the customer service representative).

In some implementations, the first section may comprise a first plurality of portions of the transcript that are associated with the information identifying the first speaker (e.g., a first identifier of the first speaker) and the second section may comprise a second plurality of portions of the transcript that are associated with the information identifying the second speaker (e.g., a second identifier of the second speaker). In some examples, the summarization system 106 may use the first identifier to identify the first plurality of portions and may use the second identifier to identify the second plurality of portions.

In some examples, the transcript may be formatted according to a format that includes the information identifying the first speaker and the information identifying the second speaker. For instance, the transcript may be formatted according to a JavaScript Object Notation (JSON) format (e.g., the transcript may be a JSON object) and may include channel identifiers that identify the first speaker and the second speaker. The JSON format is merely provided as an example, and other examples may include other formats for the transcript.

The summarization system 106 may perform channel separation on the JSON object, using the channel identifiers, to identify the first section and the second section. The channel identifiers, of the JSON object, may identify a first audio channel and a second audio channel. In some implementations, the first section may be identified based on the audio data including data indicating that the speech of the first speaker was captured via the first audio channel. Similarly, the second section may be identified based on the audio data including data indicating that the speech of the second speaker was captured via the second audio channel.

In some examples, a first channel identifier may identify the first audio channel (associated with the first speaker) and may be used to identify the first section. The second channel identifier may identify the second audio channel (associated with the second speaker) and may be used to identify the second section. Alternatively, a first group of channel identifiers may be used to identify the first section and a second group of channel identifiers may be used to identify the second section. Alternatively, heuristic rule, e.g., with even numbered channels representing customer representatives and odd numbered channels representing customer can also be used for channel/speaker separation. The channel identifiers, described herein, may include alphanumerical identifiers (e.g., alphanumerical characters).

In some implementations, the summarization system 106 may use a modified Bidirectional Encoder Representations from Transformers (BERT) model, for speaker (channel) identification, to identify the first section of the transcript and the second section of the transcript, based on training on historical transcripts where the channels/speakers have already been identified. In some examples, the summarization system 106 may provide sentences in the transcript as an input to the modified BERT model and the modified BERT model may analyze the sentences to identify which one or more first sentences belong to the first section and which one or more second sentences belong to the second section. The summarization system 106 may use the modified BERT model to identify the first section and the second section in the event the transcript does not include information identifying the first speaker and the second speaker and/or in the event the transcript includes information that does not clearly identify the first speaker and the second speaker (e.g., in the event the transcript does not include information identifying the first audio channel and/or the second audio channel).

The BERT model is a machine learning technique for natural language processing and is merely provided as an example. Other examples of machine learning techniques for natural language processing (e.g., Generative Pre-trained Transformer and/or XLNet) may be used to identify the first section and the second section. The modified BERT model may include a BERT model (e.g., a pre-trained BERT model) that is modified to include a linear classifier as an additional layer (e.g., additional natural language processing layer) of the BERT model. In some implementations, the summarization system 106 may modify a BERT model by retraining the BERT model to include the linear classifier and, thereby, to obtain the modified BERT model.

In some implementations, based on the foregoing, the summarization system 106 may separate the transcript into the speaker transcripts. For example, the summarization system 106 may separate the transcript into a first speaker transcript that includes the first section of the transcript and a second speaker transcript that includes the second section of the transcript. While the description herein refers to the summarization system 106 performing actions with respect to the first speaker transcript and the second speaker transcript, in some implementations, the summarization system 106 may perform the actions with respect to the entire transcript (e.g., without separating the transcript into the first speaker transcript and the second speaker transcript).

As shown in FIG. 1B, and by reference number 130, the summarization system 106 may preprocess the speaker transcripts. For example, the summarization system 106 (e.g., using the preprocessing module 108) may preprocess the first speaker transcript to modify punctuation in the first speaker transcript after identifying and removing delimiters in the first speaker transcript. Additionally, the summarization system 106 (e.g., using the preprocessing module 108) may preprocess the second speaker transcript to modify punctuation in the second speaker transcript after identifying and removing delimiters in the second speaker transcript, as described below.

In some implementations, the summarization system 106 may identify punctuation in the first speaker transcript and remove the punctuation in the first speaker transcript. For example, the summarization system 106 may identify and remove all punctuation from the first speaker transcript. After removing the punctuation, the summarization system 106 may analyze the first speaker transcript to identify and remove delimiters in the first speaker transcript. As a result of removing the delimiters, the summarization system 106 may obtain a continuous string of text without punctuation. A delimiter, as used herein, may refer to information (e.g., included in the transcript) that indicates a pause during the multi-speaker conversation. For example, a delimiter may include a duplicate term (e.g., word), a phrase, text indicating a human expression (e.g., a laughter, a sigh, and/or another human expression), an indicator of a break in text (e.g., a page break and/or a new line), and/or an indicator of an end of a sentence (e.g. a period).

In some implementations, after removing the delimiters, the summarization system 106 may initiate a modified BERT model (e.g., different from the BERT model described above in connection with speaker identification), to analyze terms (included in the continuous string of text of the first speaker transcript) and classify the terms (e.g., words) based on the analysis (e.g., classify the terms using the added linear classifier of the modified BERT model), for punctuation restoration. For example, the summarization system 106 may provide the continuous string of text of the first speaker transcript as input to the modified BERT model to cause the modified BERT model to classify the terms in accordance with a punctuation mark that is to follow the terms. In other words, the linear classifier (of the modified BERT model) may predict a punctuation mark that is to follow the terms. For example, the liner classifier may classify (or predict) a first term according to a first classification indicating that no punctuation is to follow the first term, classify (or predict) a second term according to a second classification indicating that a period is to follow the second term, classify (or predict) a third term according to a third classification indicating that a comma is to follow the third term, classify (or predict) a fourth term according to a fourth classification indicating that a question mark is to follow the fourth term, and so on. In some implementations, all layers of the modified BERT model for punctuation restoration can be retrained based on a large corpus of text for a more improved performance of the modified BERT model.

In some implementations, the summarization system 106 may use the modified BERT model for punctuation restoration (e.g., a tokenizer feature of the modified BERT model) to tokenize the terms to create tokens and encode the tokens (e.g., in accordance with a numerical format). For example, a term may be converted to a numerical value. The summarization system 106 (e.g., using the modified BERT model) may create segments of encoded tokens. For example, for a particular encoded token, the summarization system 106 may form a segment of encoded tokens that includes the particular encoded token, one or more encoded tokens preceding the particular encoded token, and one or more encoded tokens follow the particular encoded token. In some instances, the segment may correspond to a sentence. In some examples, the transcription system 104 may insert a placeholder token in a portion of the segment (e.g., halfway through the segment). In some examples, the placeholder token may indicate a midpoint with respect to the segment and may indicate a size of the segment.

The summarization system 106 may use the modified BERT model (e.g., use the linear classification) for punctuation restoration to analyze the segments and determine a classification for the encoded tokens of the segments based on the placeholder tokens. For example, a first encoded token of a segment may be classified according to the first classification, a second encoded token of the segment may be classified according to the third classification, and so on until a last encoded token of the segment which may be classified according to the second classification (e.g., to indicate an ending of a sentence). In some instances, the size of a segment (e.g., as indicated based on the placeholder token inserted in the segment) may be used to determine the classification of the encoded tokens of the segment. For example, based on the size of the segment, the modified BERT model may determine whether a segment is to include a comma (e.g., determine which encoded token, of the segment, is to be classified according to the third classification).

The summarization system 106 (e.g., using the modified BERT model for punctuation restoration) may convert the encoded tokens to the terms (from which the encoded tokens were converted). The summarization system 106 (e.g., using the modified BERT model) may map a classification of an encoded token to a term corresponding to the encoded token and, accordingly, determine the classification for the term. In some examples, the summarization system 106 (e.g., using the modified BERT model) may merge terms (e.g., merge duplicate terms for the purpose of creating a proper or coherent sentence). The summarization system 106 may restore (or add) punctuation to the first speaker transcript. For example, the summarization system 106 may identify terms that are classified according to the second classification and may restore (or add) a period following such terms.

In some implementations, the process of restoring only periods may be referred to as partial punctuation restoration (as opposed to a process of restoring different types of punctuations which may be referred to as full punctuation restoration). In some examples, the summarization system 106 may perform the partial punctuation restoration to identify endings of sentences (e.g., in the first speaker transcript). By restoring periods, as delimiters to the transcripts, the summarization system 106 makes the individual sentences of the transcripts to be clearly and correctly differentiable for the subsequent extraction of the most significant ones for the eventual summary generation. By restoring periods (as opposed to different types of punctuations), the summarization system 106 may expedite the preprocessing of the first speaker transcript and preserve resources (e.g., computing resources) that would have otherwise been used to restore different types of punctuation in the first speaker transcript (e.g., by way of the full punctuation restoration, as described in more detail below).

In some implementations, the summarization system 106 may perform actions, similar to the actions described above in connection with the first speaker transcript, to remove punctuation in the second speaker transcript, to classify terms included in the second speaker transcript, and to restore periods in the second speaker transcript. In some implementations, the summarization system 106 may generate a first document of terms included in the first speaker transcript and generate a second document of terms included in the second speaker transcript. The summarization system 106 may process the first document and the second document, using one or more topic models, to identify topics for the first speaker transcript and the second speaker transcript, as described in more detail below.

Figure 1C:
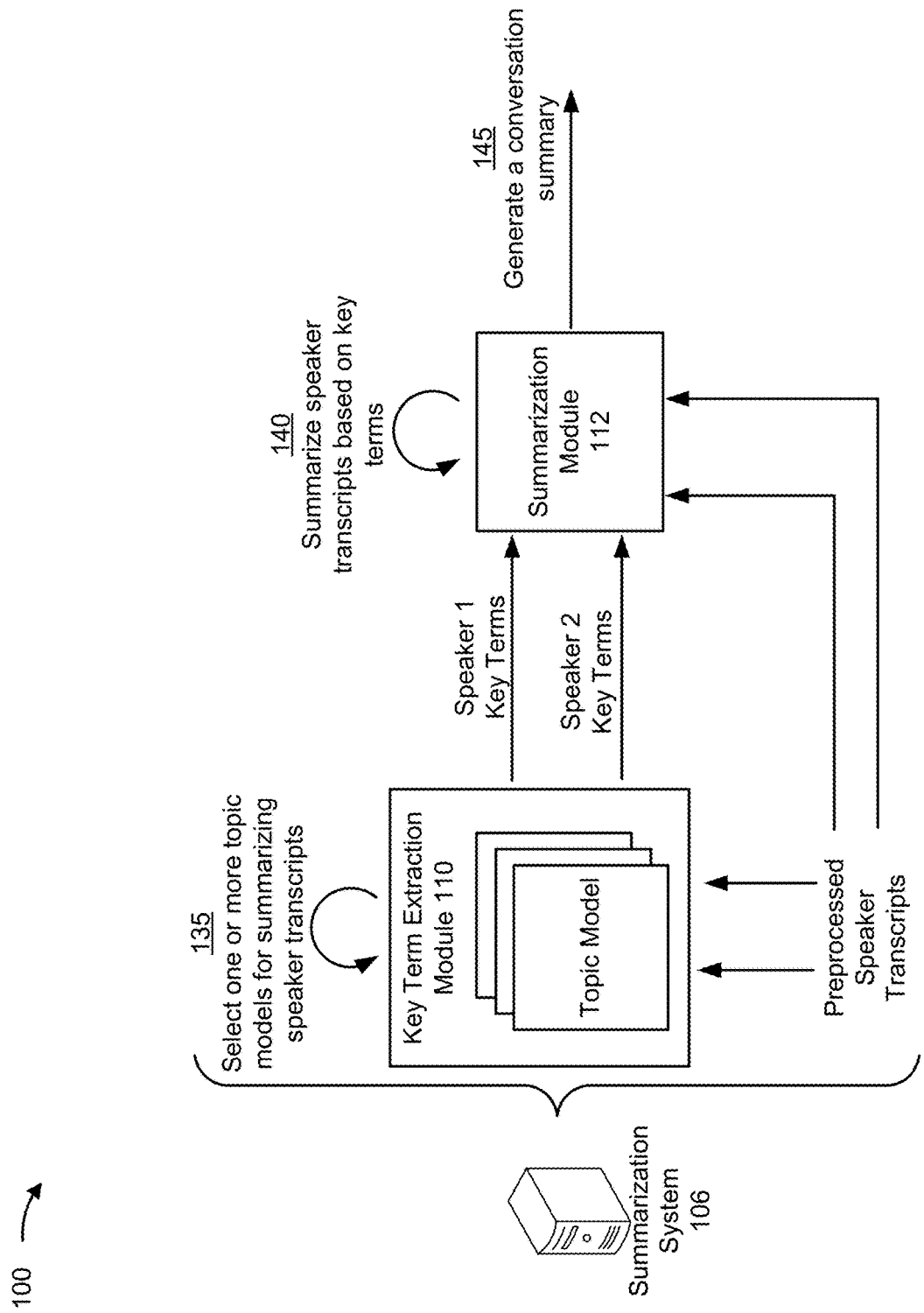

As shown in FIG. 1C, and by reference number 135, the summarization system 106 may select one or more topic models for summarizing the speaker transcripts. For example, the summarization system 106 (e.g., using the key term extraction module 110) may select the one or more topic models (e.g., the most optimal topic model from a collection of topic models) to identify a first set of key terms (e.g., words) of a topic associated with the first speaker transcript and do the same to identify a second set of key terms of a topic associated with the second speaker transcript, as explained below. The summarization system 106 may generate a summary of the first speaker transcript based on the first set of key terms and generate a summary of the second speaker transcript based on the second set of key terms, as explained below.

A topic model may refer to a model (e.g., a statistical model) that analyzes text (e.g., analyzes a corpus of terms in the text, analyzes a vocabulary of the text, and/or analyzes a frequency of the terms of the text). Based on analyzing the text, the topic model may identify one or more topics associated with the text and identify a set of key terms associated with a respective topic of the one or more topics. In some examples, separate topic models (e.g., two topic models) may be selected for the first speaker transcript and for the second speaker transcript (e.g., one topic model for the first speaker transcript and another topic model for the second speaker transcript).

A topic may be defined as a set of key terms and may be associated with a statistical probability of the set of key terms appearing in text analyzed by a topic model. The set of key terms may be included in a corpus of documents that is used to train the topic model. A topic may include billing, technical support, service/product upgrade, maintenance, and/or another topic associated with a conversation between the customer and the customer service representative (e.g., for the purpose of the example described herein). The above topics are merely provided as examples, and other examples involving different topics (e.g., depending on speakers who are part of a conversation) are applicable to the description herein.

In some implementations, the one or more selected topic models may include a latent semantic indexing (LSI) model, a latent Dirichlet allocation (LDA) model, or a hierarchical Dirichlet process (HDP) model. While the description herein refers to LSI, LDA, and HDP, the description is applicable to the use of one or more other topic models such as a probabilistic latent semantic analysis (or probabilistic latent semantic indexing), a pachinko allocation model, and/or a Hierarchical latent tree analysis.

In some implementations, the summarization system 106 may determine whether a particular topic model (or particular type of topic model) has been identified with respect to analyzing the first speaker transcript (or analyzing the first document of terms of the first speaker transcript) and/or with respect to analyzing the second speaker transcript (or analyzing the second document of terms of the second speaker transcript). In some examples, the summarization system 106 may determine that the summarization request includes information identifying the particular type of topic model (e.g., LSI, LDA, or HDP) to be used to analyze the first speaker transcript and/or analyze the second speaker transcript. In this regard, the summarization system 106 may use the particular type of topic model to analyze the first speaker transcript (or analyze the first document of terms of the first speaker transcript) and/or analyze the second speaker transcript (or analyze the second document of terms of the second speaker transcript).

In some implementations, the summarization request may include one or more hyperparameter values (e.g., a single hyperparameter value, multiple single hyperparameter values, and/or a range of hyperparameter values) associated with a topic model (e.g., the particular type of topic model). The summarization system 106 may determine the one or more hyperparameter values based on the summarization request. Additionally, or alternatively, the summarization system 106 may determine the one or more hyperparameter values based on historical data (e.g., historical hyperparameter values, historical summarization requests, and/or historical transcription requests). A hyperparameter value may refer to a value indicating a number of topics to be identified by a topic model (e.g., the particular type of topic model) as a result of the topic model analyzing text (e.g., the first speaker transcript and/or the second speaker transcript).

The summarization system 106 may generate multiple instances of the particular type of topic model based on the one or more hyperparameter values (e.g., one or more values of a hyperparameter). For example, the summarization system 106 may generate a first instance of the particular type of topic model in accordance with a first hyperparameter value (e.g., a first value of the hyperparameter), generate a second instance of the particular type of topic model in accordance with a second hyperparameter value (e.g., a second, different value of the same hyperparameter), and so on. The first instance of the particular type of topic model may analyze the first speaker transcript and identify a first quantity of topics (e.g., a first desired number of topics) associated with the first hyperparameter value, the second instance of the particular type of topic model may analyze the first speaker transcript and identify a second quantity of topics (e.g., a second desired number of topics) associated with the second hyperparameter value, and so on. Similarly, the first instance of the particular type of topic model may analyze the second speaker transcript and identify a third quantity of topics associated with the first hyperparameter value, the second instance of the particular type of topic model may analyze the second speaker transcript and identify a fourth quantity of topics associated with the second hyperparameter value, and so on.

The summarization system 106 may evaluate the multiple instances of the particular type of topic model with respect to the analysis of the first speaker transcript and/or the analysis of the second speaker transcript. In some implementations, the summarization system 106 may evaluate the multiple instances of the particular type of topic model by determining a measure of coherence of the multiple instances of the particular type of topic model. For example, the summarization system 106 may determine a coherence value (e.g., a coherence score) for each of the multiple instances of the particular type of topic model (e.g., with respect to the first speaker transcript and/or the second speaker transcript). The coherence value may determine a measure of similarity (e.g., semantic similarity) between the terms (included in text such as the first speaker transcript and/or the second speaker transcript) and the sets of key terms associated with topics identified by the particular type of topic model.

For instance, the summarization system 106 may determine a coherence value between the terms (included in the first speaker transcript) and the sets of key terms associated with a first quantity (number) of topics identified by the first instance of the particular type of topic model (based on analyzing the first speaker transcript), determine a coherence value between the terms (included in the first speaker transcript) and the sets of key terms associated with a second quantity (number) of topics identified by the second instance of the particular topic type of model, and so on. The coherence value may include a c_v score, a u_mass score, and/or another a coherence value.

The summarization system 106 may identify a first instance of the particular type of topic model with a highest coherence value out of the coherence values determined for the multiple instances of the same particular type of topic model, if specified, or all different types of topic models (with respect to analyzing the first speaker transcript). The summarization system 106 may identify a first topic (identified by the first instance of the particular type of topic model) with a set of key terms associated with a highest probability of being included in the first speaker transcript out of the probabilities associated with the sets of key terms of the topics identified by the first instance of the particular type of topic model. The summarization system 106 may generate a summary of the first speaker transcript based on the set of key terms of the first topic. The first instance of the particular type of topic model may correspond to an optimized topic model for the first speaker transcript and the first topic may correspond to a dominant topic out of the topics identified by the first instance of the particular type of topic model.

The summarization system 106 may perform similar actions for the second speaker transcript (e.g., by identifying a second instance of the particular type of topic model with a highest coherence value (with respect to analyzing the second speaker transcript), and by identifying a second topic with a set of key terms associated with a highest probability of being included in the second speaker transcript). The summarization system 106 may generate a summary of the second speaker transcript based on the set of key terms of the second topic.

In some examples, the first topic and the second topic may be a same topic. Alternatively, the first topic and the second topic may be different topics. In some examples, the first topic and the second topic may be identified by a same instance of the particular topic type of model. Alternatively, the first topic and the second topic may be identified by different instances of the particular type of topic model (specified/identified).

In some examples, the summarization system 106 may determine that the particular topic model (e.g., the particular type of topic model) has not been identified/specified. For example, the summarization system 106 may determine that the summarization request does not identify the particular type of topic model to be used in the summarization. In some implementations, the summarization system 106 may perform actions similar to the actions described above with respect to identifying the first topic for the first speaker transcript and the second topic for the second speaker transcript (e.g., by using the one or more topic models (of a same or different types of topic model) to analyze the first speaker transcript and to analyze the second speaker transcript). For example, the summarization system 106 may select a first topic model (of the one or more topic models of a same or different types of topic model), generate multiple instance of the first topic model, and determine coherence values for the multiple instances of the first topic model with respect to analyzing the first speaker transcript to select the most optimal one. The summarization system 106 may perform similar actions with respect to a second topic model (of the one or more topic models).

The summarization system 106 may identify an instance of a first topic model (of the one or more topic models) with a highest coherence value out of the coherence values determined for the instances of the one or more topic models of same or different types and identify a first topic identified by the instance of the topic model (e.g., the most dominant topic) with a set of key terms associated with a highest probability of being included in the first speaker transcript.

In some implementations, the summarization system 106 may select a same type of topic model for the first speaker transcript and the second speaker transcript. Alternatively, the summarization system 106 may select different types of topic model for the first speaker transcript and the second speaker transcript. In some implementations, a quantity (number) of topics identified using a same instance of a same type of topic model may vary based on text analyzed by the same instance of the same topic model. For example, the same instance of the same type of topic model may identify a number of topics for the first speaker transcript that is different than a number of topics identified for the second speaker transcript.

As shown in FIG. 1C, and by reference number 140, the summarization system 106 may summarize the speaker transcripts based on key terms. For example, the summarization system 106 (e.g., using the summarization module 112) may generate a first transcript summary of the first speaker transcript based on the set of key terms associated with the first topic (hereafter referred to "first set of key terms"), as described below. Additionally, the summarization system 106 (e.g., using the summarization module 110) may generate a second transcript summary of the second speaker transcript based on the set of key terms associated with the second topic (hereafter referred to "second set of key terms"), as described below.

In some implementations, the summarization system 106 may use the first set of key terms to obtain terms, included locally in the first speaker transcript that may be used to generate the first transcript summary of the first speaker transcript. Similarly, the summarization system 106 may use the second set of key terms to obtain terms, included locally in the second speaker transcript that may be used to generate the second transcript summary of the second speaker transcript.

In some implementations, the summarization system 106 may compare the first set of key terms and the second set of key terms to identify a measure of similarity (word based) between the first set of key terms and the second set of key terms. Based on the comparison, the summarization system 106 may identify one or more terms (from the first set of key terms and the second set of key terms) that satisfy a similarity threshold (e.g., a value indicating a measure of similarity between terms). The one or more terms may be terms that are included in the first set of key terms and the second set of key terms or that are common (e.g., semantically common) with respect to the first set of key terms and the second set of key terms. This set of key terms is global in nature and may not be present locally in the transcripts (first and second) themselves. The summarization system 106 may construct a string or a document of common terms using the one or more identified terms.

In some implementations, the summarization request may include information identifying the similarity threshold (e.g., for word based similarity analysis). The summarization system 106 may determine the similarity threshold based on the summarization request. Additionally, or alternatively, the summarization system 106 may determine the similarity threshold based on historical data (e.g., historical similarity thresholds, historical transcripts, and/or other historical data).

In some implementations, the summarization system 106 may analyze sentences from the first speaker transcript to identify unique sentences included in the first speaker transcript. For example, the summarization system 106 may determine a measure of similarity (e.g., sentence based) between two or more sentences (from the first speaker transcript), retain one sentence (out of the two or more sentences) as a unique sentence, and discard remaining sentences of the two or more sentences. In other words, the summarization system 106 may remove, from the first speaker transcript, sentences that are duplicative (e.g., semantically duplicative).

In some implementations, when identifying the unique sentences, the summarization system 106 may use a model to generate a value for each sentence in the first speaker transcript (e.g., a score indicating a meaning of the sentence) and determine a correlation between sentences. In some examples, the summarization system 106 may generate a correlation matrix based on the values for the sentences. The summarization system 106 may identify a group of correlated sentences (e.g., correlated based on the values for the sentences) and remove a duplicate sentence from the group of correlated sentences. The summarization system 106 may iterate the actions above for an entirety of the first speaker transcript and identify the unique sentences for the first speaker transcript. The summarization system 106 may perform similar actions to identify unique sentences for the second speaker transcript.

The summarization system 106 may compare the unique sentences, of the first speaker transcript, and the string of common terms. For example, the summarization system 106 may compare a first unique sentence and the string of common terms to determine a measure of similarity (e.g., semantic similarity between sentences) between the first unique sentence and the string of common terms, compare a second unique sentence and the string of common terms to determine a measure of similarity (e.g., sentence based) between the second unique sentence and the string of common terms, and so on. Based on the comparisons, the summarization system 106 may to identify one or more unique sentences that meet the similarity threshold with respect to the string of common terms. In some implementations, the summarization request may include information identifying this similarity threshold (e.g., for sentence based similarity analysis).

The summarization system 106 may order the one or more unique sentences in an order based on a measure of similarity with respect to the string of common terms and select a quantity of sentences from the ordered one or more unique sentences. In some implementations, the summarization request may include information identifying a value of the quantity of sentences. Accordingly, the summarization system 106 may determine the quantity of sentences based on the information identifying the value of the quantity of sentences (included in the summarization request). Additionally, or alternatively, the summarization system 106 may determine the quantity of sentences based on historical data (e.g., historical quantities of sentences, historical summarization requests, and/or historical speaker transcripts).

The summarization system 106 may generate the first transcript summary based on the selected unique sentences. In some examples, the summarization system 106 may generate the first transcript summary by concatenating the selected unique sentences in an order in which the selected unique sentences appeared in the first speaker transcript. The summarization system 106 may generate the second transcript summary in a manner similar to the manner described above with respect to generating the first transcript summary.

Alternatively to generating the first transcript summary and the second transcript summary based on the string of common terms as described above, the summarization system 106 may identify a measure of similarity (e.g., word based) between the first set of key terms and terms included in the first speaker transcript. For example, the summarization system 106 may identify one or more first terms (from the first speaker transcript) that satisfy the similarity threshold with respect to one or more first terms from the first set of key terms (of the first topic). In some examples, the summarization system 106 may additionally determine a measure of similarity between the one or more first terms. The summarization system 106 may construct a first string of terms using the one or more first terms (from the first speaker transcript). The summarization system 106 may identify one or more second terms from the second speaker transcript based on the second set of key terms (of the second topic) and may construct a second string of terms using the one or more second terms, in a manner similar to the manner described above with respect to constructing the first string of terms.

The summarization system 106 may generate the first transcript summary using the first string of terms, in a manner similar to the manner described above with respect to generating the first transcript summary using unique sentences and the string of common terms. The summarization system 106 may generate the second transcript summary using the second string of terms, in a manner similar to the manner described above with respect to generating the second transcript summary using unique sentences and the string of common terms.

As shown in FIG. 1C, and by reference number 145, the summarization system 106 may generate a conversation summary. For example, the summarization system 106 may generate the conversation summary based on the first transcript summary and the second transcript summary. In some implementations, when generating the conversation summary, the summarization system 106 may determine a first identifier of the first speaker (e.g., a name, a title, and/or other information identifying the first speaker) and determine a second identifier of the second speaker (e.g., a name, a title, and/or other information identifying the second speaker). The summarization system 106 may combine the first transcript summary in association with the first identifier and the second transcript summary in association with the second identifier to form the conversation summary. For example, the conversation summary may include the first transcript summary in association with the first identifier and include the second transcript summary in association with the second identifier.

In some implementations, the summarization system 106 may restore (or add) punctuation to the first transcript summary, in a manner similar to the manner described above in connection with reference number 130. For example, the summarization system 106 may restore punctuation to the first transcript summary based on the classification of the terms included in the first transcript summary. In this instance, the summarization system 106 perform a full punctuation restoration by adding one or more periods, commas, question marks, and/or other punctuation marks (as opposed to a partial punctuation restoration as described above in connection with reference number 130). The summarization system 106 may restore punctuation to the second transcript summary in a manner similar to the manner described above with respect to the first transcript summary.

In some implementations, the summarization system 106 may restore punctuation to the first transcript summary and to the second transcript summary after generating the conversation summary. Alternatively, the summarization system 106 may restore punctuation to the first transcript summary and to the second transcript summary prior to generating the conversation summary. The summarization system 106 may restore punctuation, to the first transcript summary and to the second transcript summary, using the modified BERT model for punctuation restoration in a manner similar to the manner described above.

Figure 1D:
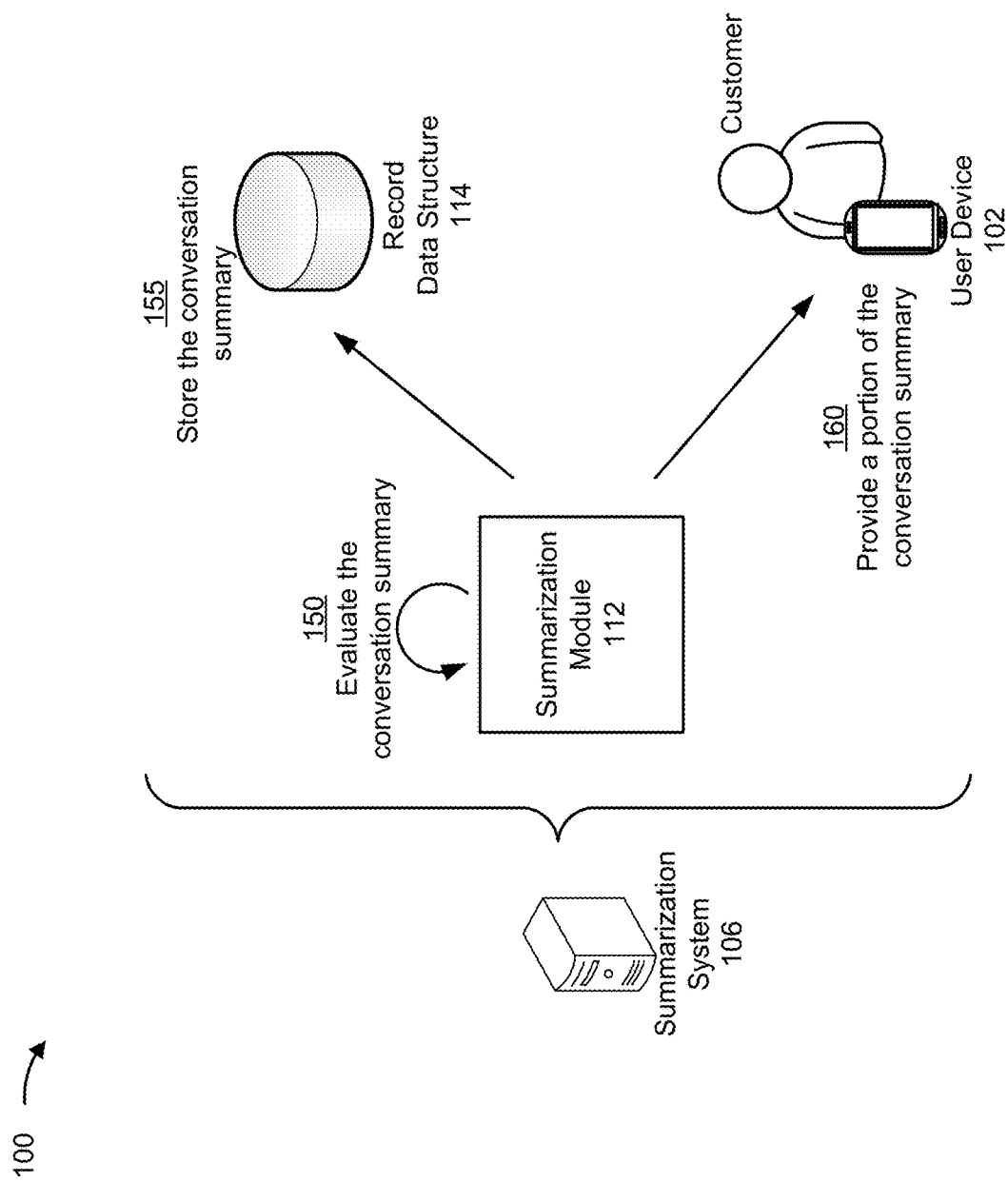

As shown in FIG. 1D, and by reference number 150, the summarization system 106 may evaluate the conversation summary. For example, the summarization system 106 may determine a measure of quality (e.g., a quality score of the information content) of the conversation summary and/or a measure of readability (e.g., a punctuation restoration accuracy score) of the conversation summary. In some implementations, the summarization system 106 may determine a measure of quality of the transcript, determine a measure of quality of the conversation summary, determine a measure of quality of the first transcript summary, and/or determine a measure of quality of the second transcript summary. In some examples, the summarization system 106 may determine an average measure of quality based on the measure of quality of the first transcript summary and the measure of quality of the second transcript summary. In some implementations, the summarization system may determine average measures of qualities of the first and second transcript summaries from separate collections of first transcript summaries and second transcript summaries. In some implementations, when determining the measure of quality, the summarization system 106 may determine a Recall-Oriented Understudy for Gisting Evaluation (ROUGE) score (e.g., a ROUGE score for the conversation summary, a ROUGE score for the first transcript summary, and/or a ROUGE score for the second transcript summary).

In some implementations, the summarization system 106 may compare the measure of quality of the transcript and the measure of quality of the conversation summary to determine whether the measure of quality of the conversation summary exceeds the measure of quality of the transcript, compare the measure of quality of the transcript and the measure of quality of the first transcript summary to determine whether the measure of quality of the first transcript summary exceeds the measure of quality of the transcript, and/or compare the measure of quality of the transcript and the measure of quality of the second transcript summary to determine whether the measure of quality of the second transcript summary exceeds the measure of quality of the transcript.

The summarization system 106 may perform similar comparisons with respect to an amount of time for generating the transcript, an amount of time for generating the conversation summary, an amount of time for generating the first transcript summary, and/or an amount of time for generating the second transcript summary. For example, the summarization system 106 may determine whether the amount of time for generating the transcript exceeds the amount of time for generating the conversation summary, determine whether the amount of time for generating the transcript exceeds the amount of time for generating the first transcript summary, and/or determine whether the amount of time for generating the transcript exceeds the amount of time for generating the second transcript summary.

The summarization system 106 may perform similar comparisons with respect to a length of the transcript, a length of the conversation summary, a length of the first transcript summary, and/or a length of the second transcript summary. The summarization system 106 may perform similar comparisons between historical conversation summaries and the conversation summary. In some implementations, a result of one or more of the comparisons (described above) may be used to retrain the modified BERT model.

In some implementations, the summarization system 106 may determine the measure of readability as a measure of accuracy of the restoration of the punctuations described above. For example, the summarization system 106 may compare the punctuation in the conversation summary and the punctuation in the transcript. For instance, summarization system 106 may determine a measure of match between the punctuation in the conversation summary and the punctuation in a corresponding portion of a partially punctuated ("period" restored) transcript (e.g., determine a percentage match between the punctuation in the conversation summary and the corresponding portion of the punctuation in the partially punctuated transcript). As an example, the summarization system 106 may determine a measure of match between the periods in the conversation summary and the periods in a corresponding portion of the partially punctuated transcript.

In some implementations, the summarization system 106 may use information regarding the measure of accuracy to retrain the modified BERT punctuation restoration model to improve the accuracy of the modified BERT model with respect to restoring punctuation in conversation summaries. Improving the accuracy of the modified BERT model may improve speed and efficiency of the modified BERT model, and thereby conserve computing resources, networking resources, and/or similar resources that would have otherwise been used by slower and less efficient models. In some implementations, a human evaluation (e.g., evaluation by customer representatives, customers, and/or third party individuals) of the quality and/or the accuracy of the conversation summary (e.g., in addition, or alternatively, to the summarization system 106 determining the measure of quality and/or the measure of accuracy of the conversation summary) may be made and a result of that human evaluation may be used to retrain the modified BERT model.

As shown in FIG. 1D, and by reference number 155, the summarization system 106 may store the conversation summary. For example, the summarization system 106 may store, in the record data structure 114, the conversation summary in association with information identifying the first speaker (e.g., the first identifier) and/or information identifying the second speaker (e.g., the second identifier). In some implementations, the summarization system 106 may store the conversation summary to memorialize an interaction between the first speaker and the second speaker. Additionally, or alternatively, the summarization system 106 may store the conversation summary for the purpose of the conversation summary being subsequently retrieved to evaluate a performance of at least one of the first speaker or the second speaker (e.g., a performance of the customer service representative), and/or to determine a measure of satisfaction of at least one of the first speaker or the second speaker (e.g., a measure of satisfaction of the customer).

As shown in FIG. 1D, and by reference number 160, the summarization system 106 may provide the conversation summary. For example, the summarization system 106 may provide a portion of the conversation summary using the customer information. For instance, the summarization system 106 may transmit a portion of the conversation summary (e.g., a portion or an entirety of the second speaker transcript summary) to the customer to memorialize a resolution of an issue associated with the conversation and to prevent additional telephone calls from the customer regarding the same issue. In some implementations, the summarization system 106 may transmit a message (including the portion of the conversation summary) to the user device 102. The message may be transmitted in accordance with a short message service (SMS) protocol and/or a multimedia message service (MMS) protocol.

Additionally, or alternatively, the summarization system 106 may transmit a message (including the portion of the conversation summary) to the network address identified in the customer information. Additionally, or alternatively, the summarization system 106 may transmit an instant message (including the portion of the conversation summary) using the instant message identifier identified in the customer information. Additionally, or alternatively, the summarization system 106 may transmit an e-mail (including the portion of the conversation summary) to the e-mail address identified in the customer information. Additionally, or alternatively, the summarization system 106 may cause a copy of the portion of the conversation summary to be delivered at the address or the location identified in the customer information.

In some implementations, the summarization system 106 may cause one or more devices to perform one or more actions associated with one or more topics of the conversation summary. For example, the summarization system 106 may cause a bill of the customer to be adjusted. Additionally, or alternatively, the summarization system 106 may cause one or more services to be provided to the customer (e.g., provide telecommunication services); cause one or more services, associated with the customer, to be adjusted (e.g., add a service, remove a service, and/or modify features of a service); cause one or more devices, associated with the customer, to be configured (e.g., cause the one or more devices to reboot, cause one or more devices to power up or power down, or cause software to be installed and/or by removed from the one or more device); and/or cause a product to be delivered to a location of the customer. For example, the summarization system 106 may cause an autonomous device to navigate to the location of the customer to deliver the product at the location.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
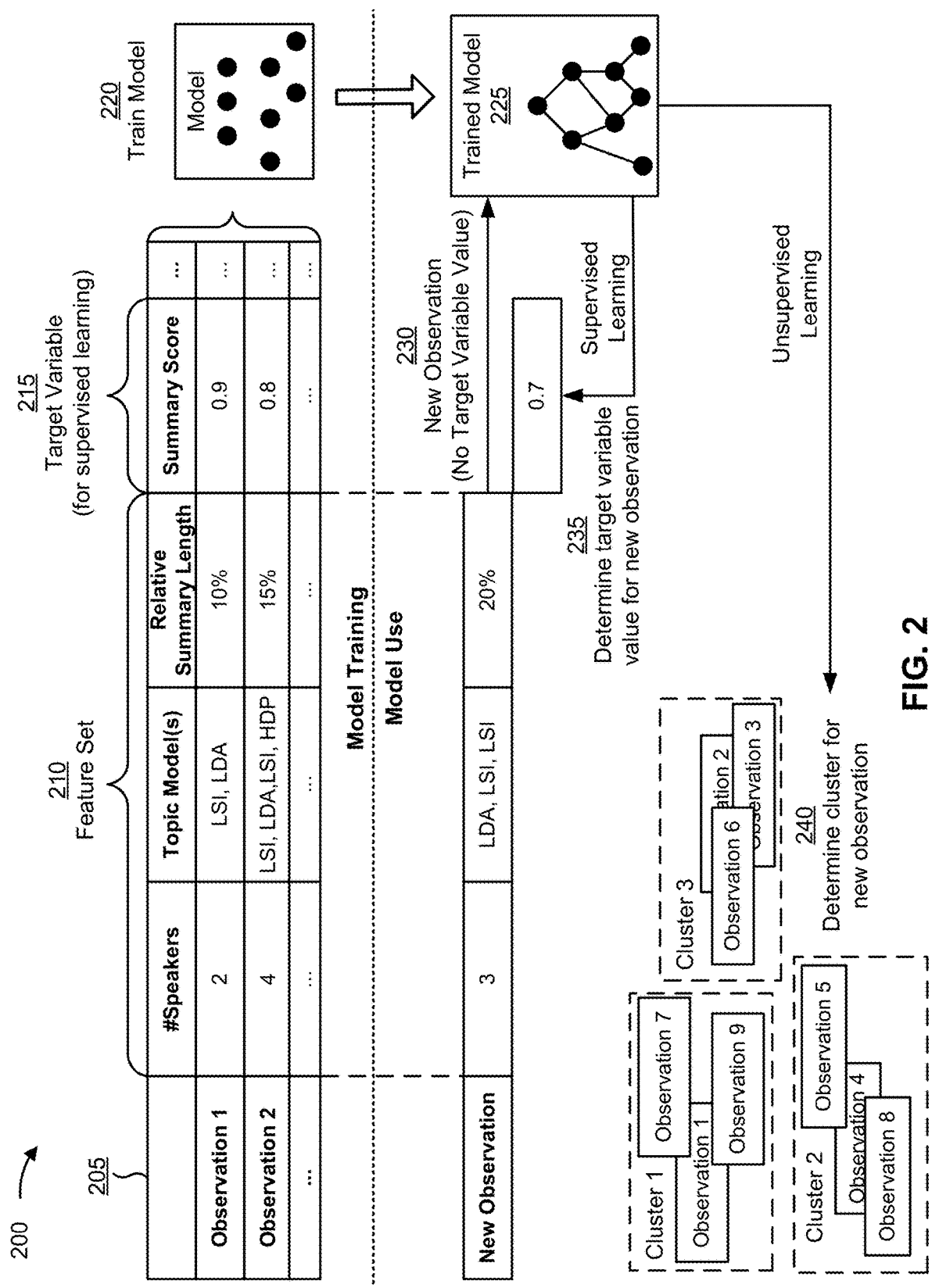
FIG. 2 is a diagram illustrating an example of training and using a machine learning model in connection with generating a summary of a multi-speaker conversation.

FIG. 2 is a diagram illustrating an example 200 of training and using a machine learning model in connection with generating a summary of a multi-speaker conversation. The machine learning model training and usage described herein may be performed using a machine learning system. The machine learning system may include or may be included in a computing device, a server, a cloud computing environment, or the like, such as the summarization system 106 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the summarization system 106, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the summarization system 106. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of #Speakers, a second feature of Topic Model(s), a third feature of Relative Summary Length (e.g., relative to the length of the transcript from which the conversation summary is generated), and so on. As shown, for a first observation, the first feature may have a value of 2, the second feature may have a value of LSI, LDA, the third feature may have a value of 10%, and so on. These features and feature values are provided as examples, and may differ in other examples. For example, the feature set may include one or more of the following features: quantity of sentences for summary, user selected topic model(s), and threshold similarity score.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is Summary Score, which has a value of 0.9 for the first observation.

The feature set and target variable described above are provided as examples, and other examples may differ from what is described above. For example, for a target variable of conversation summary, the feature set may include: quantity of sentences for summary, user selected topic model(s), and threshold similarity score.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of #Speakers, a second feature of Topic Model(s), a third feature of Relative Summary Length, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed. A trained topic model can be used to identify the most dominant topic in a new and related transcript together with the associated key terms.

As an example, the trained machine learning model 225 may predict a value of 0.9 for the target variable of Summary Score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a conversation summary should be generated based on LSI or LDA. The first automated action may include, for example, generating a conversation summary based on LSI or LDA.

As another example, if the machine learning system were to predict a value of 0.4 the target variable of Summary Score, then the machine learning system may provide a second (e.g., different) recommendation (e.g., select different topic models) and/or may perform or cause performance of a second (e.g., different) automated action (e.g., selecting different topic models and generating a conversation summary using the different topic models).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to generate a summary of a multi-speaker conversation. The machine learning system enables recognition and/or identification of tens, hundreds, thousands, or millions of features and/or feature values for tens, hundreds, thousands, or millions of observations, thereby increasing accuracy and consistency and reducing delay associated with generating a summary of a multi-speaker conversation relative to requiring computing resources to be allocated for tens, hundreds, or thousands of operators to manually generate a summary of a multi-speaker conversation using the features or feature values.

As indicated above, FIG. 2 is provided as an example. Other examples may differ from what is described in connection with FIG. 2.

Figure 3:
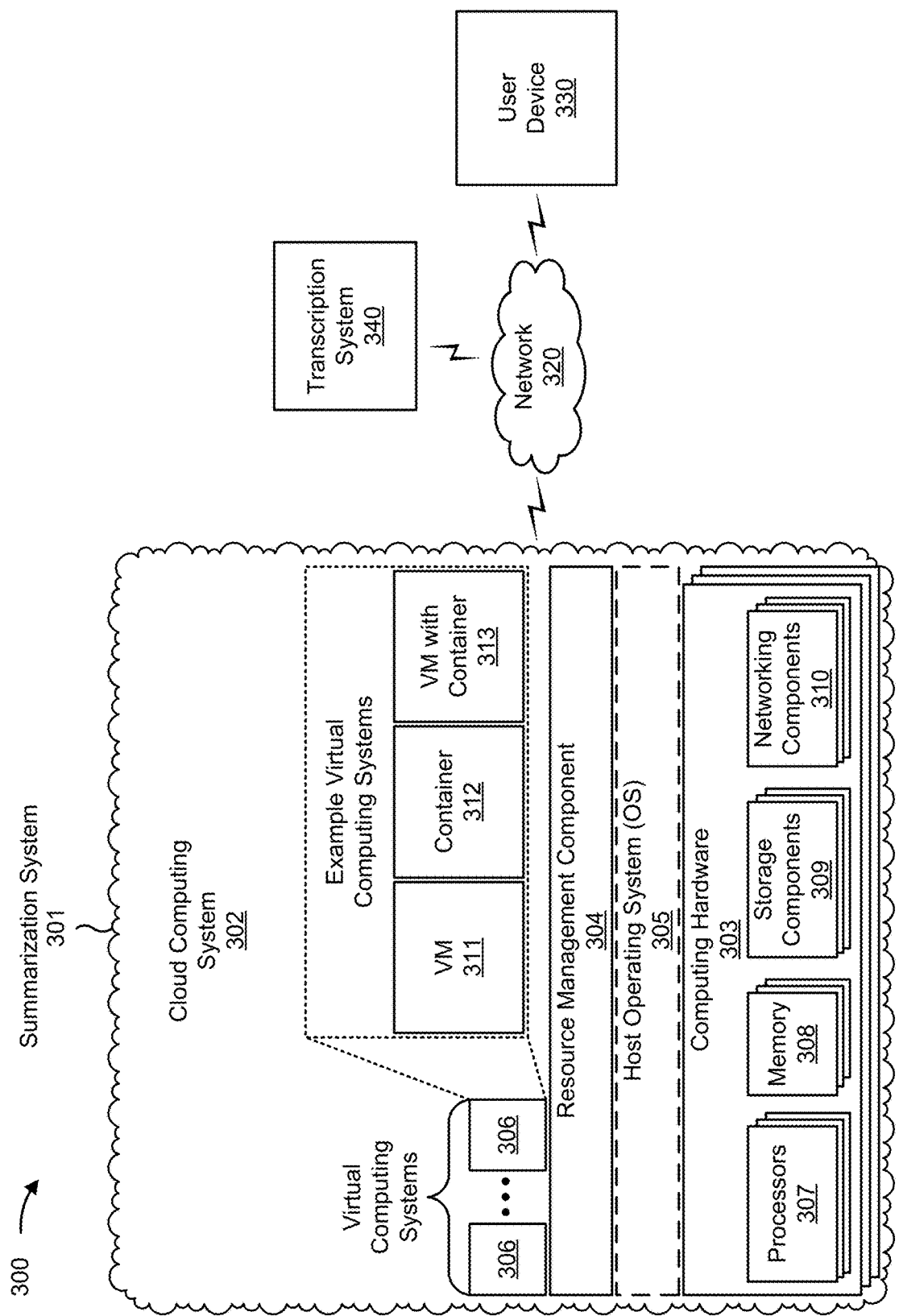
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a summarization system 301 (which may correspond to the summarization system 106 discussed in connection with FIGS. 1A-1D), which may include one or more elements of and/or may execute within a cloud computing system 302. The cloud computing system 302 may include one or more elements 303-313, as described in more detail below. As further shown in FIG. 3, environment 300 may include a network 320, a user device 330 (which may correspond to the user device 102 discussed in connection with FIGS. 1A-1D) and/or a transcription system 340 (which may correspond to the transcription system 104 discussed in connection with FIGS. 1A-1D). Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the summarization system 301 may include one or more elements 303-313 of the cloud computing system 302, may execute within the cloud computing system 302, and/or may be hosted within the cloud computing system 302, in some implementations, the summarization system 106 301 may not be cloud-based (e.g., may be implemented outside of a cloud computing system) or may be partially cloud-based. For example, the summarization system 301 may include one or more devices that are not part of the cloud computing system 302, such as device 400 of FIG. 4, which may include a standalone server or another type of computing device. The summarization system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The user device 330 may include one or more devices capable of receiving, generating, storing, processing, and/or providing information, as described elsewhere herein. The user device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 330 may communicate with one or more other devices of environment 300, as described elsewhere herein.

The transcription system 340 may include one or more devices (e.g., server devices) capable of generating a transcript of a multi-speaker conversation. In some implementations, the transcription system 340 may include a speech-to-text functionality that generates text from audio data. The transcription system 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
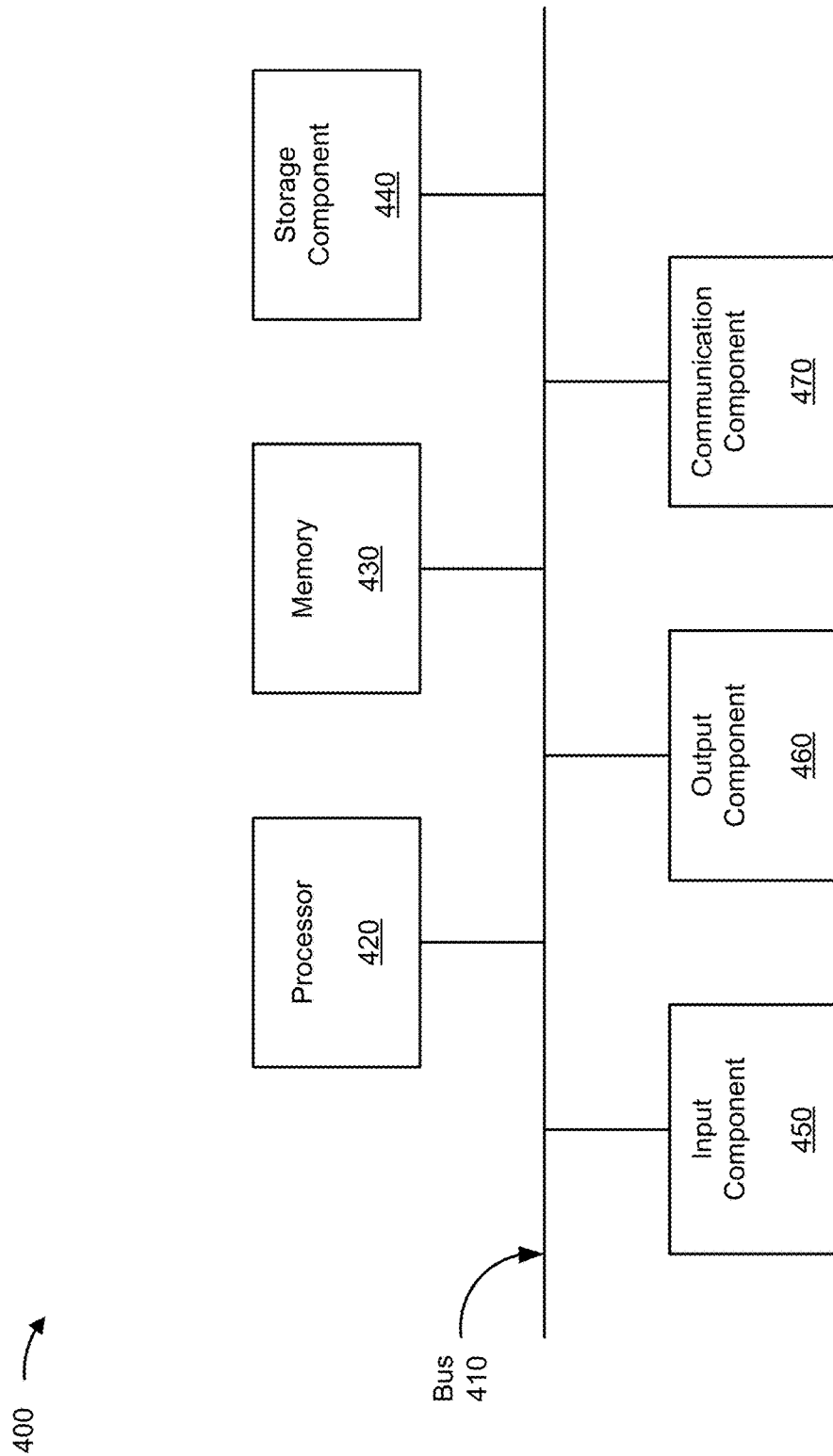
FIG. 4 is a diagram of example components of one or more devices of FIG. 3.

FIG. 4 is a diagram of example components of one or more devices of FIG. 3. The example components be components of a device 400, which may correspond to the summarization system 301, the user device 330, and/or the transcription system 340. In some implementations, the summarization system 301, the user device 330, and/or the transcription system 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with systems and methods for generating a summary of a multi-speaker conversation. In some implementations, one or more process blocks of FIG. 5 may be performed by a device (e.g., summarization system 106). In some implementations, one or more process blocks of FIG. 5 may be performed by another device or a group of devices separate from or including the device, such as a transcription system (e.g., transcription system 104) and/or a user device (e.g., user device 102). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include identifying a first section and a second section of a transcript of a conversation between a first speaker and a second speaker (block 505). For example, the device may identify a first section and a second section of a transcript of a conversation between a first speaker and a second speaker, wherein the first section corresponds to speech of the first speaker and the second corresponds to speech of the second speaker, as described above.

In some implementations, the first section corresponds to speech of the first speaker and the second corresponds to speech of the second speaker. In some implementations, the transcript may include punctuation (e.g., various punctuation marks) or other delimiters. In some implementations, the transcript may comprise raw text generated by a speech-to-text generator of the transcription system (e.g., based on audio data of the conversation).

As further shown in FIG. 5, process 500 may include separating the first section and the second section to form a first speaker transcript associated with the first speaker and a second speaker transcript associated with the second speaker (block 510). For example, the device may separate the first section and the second section to form a first speaker transcript associated with the first speaker and a second speaker transcript associated with the second speaker, as described above.

In some implementations, the transcript may include information identifying the first section of the transcript (that corresponds to speech of the first speaker) and information identifying the second section of the transcript (that corresponds to speech of a second speaker). In some implementations, the first section comprises a first plurality of portions of the transcript that are associated with a first identifier of the first speaker, wherein the first section is identified based on the first plurality of portions being associated with the first identifier, and wherein the second section comprises a second plurality of portions of the transcript that are associated with a second identifier of the second speaker, wherein the second section is identified based on the second plurality of portions being associated with the second identifier.

In some implementations, process 500 includes identifying a first plurality of portions of the transcript that are associated with a first identifier of the first speaker and identifying a second plurality of portions of the transcript that are associated with a second identifier of the second speaker. The first section may include the first plurality of portions. The second section may include the second plurality of portions.

As further shown in FIG. 5, process 500 may include removing a first set of delimiters in the first section and a second set of delimiters in the second section (block 515). For example, the device may remove a first set of delimiters in the first section and a second set of delimiters in the second section, as described above.

As further shown in FIG. 5, process 500 may include punctuating the first speaker transcript based on the first set of delimiters/punctuation marks (block 520). For example, the device may punctuate the first speaker transcript based on the first set of delimiters/punctuation marks, as described above. The first set of key terms and the second set of key terms may be determined, according to the one or more topic models, based on the first punctuation marks and the second punctuation marks. In some examples, the first punctuation marks and the second punctuation marks may be a same type of punctuation mark.

As further shown in FIG. 5, process 500 may include punctuating the second speaker transcript based on the second set of delimiters/punctuation marks (block 525). For example, the device may punctuate the second speaker transcript based on the second set of delimiters/punctuation marks, as described above. In some implementations, process 500 includes identifying a first set of delimiters in the first section, punctuating the first speaker transcript based on the first set of delimiters/punctuation marks, identifying a second set of delimiters in the second section, and punctuating the second speaker transcript based on the second set of delimiters/punctuation marks.

As further shown in FIG. 5, process 500 may include selecting, from a plurality of topic models, a first topic model to analyze the first speaker transcript and a second topic model to analyze the second speaker transcript (block 530). For example, the device may select, from a plurality of topic models, a first topic model to analyze the first speaker transcript and a second topic model to analyze the second speaker transcript, as described above.

In some implementations, the plurality of topic models include two or more of a latent semantic indexing model, a latent Dirichlet allocation model, or a hierarchical Dirichlet process model. In some implementations, the first topic model and the second topic model may be selected from a plurality of topic models based on respective identified topics of the first speaker transcript and the second speaker transcript. The first and second topic models may be of the same or of different topic model types. The plurality of topic models may be configured to identify key terms associated with different topics.

As further shown in FIG. 5, process 500 may include causing the first topic model to identify a first set of key terms associated with the first speaker transcript and the second topic model to identify a second set of key terms associated with the second speaker transcript (block 535). For example, the device may cause the first topic model to identify a first set of key terms associated with the first speaker transcript and the second topic model to identify a second set of key terms associated with the second speaker transcript, as described above.

In some implementations, process 500 includes determining whether a particular type of topic model has been identified with respect to analyzing the first speaker transcript and the second speaker transcript, and wherein selecting the first topic model and the second topic model comprises selecting the first topic model and the second topic model based on determining whether the particular type of topic model has been identified.

In some implementations, process 500 includes determining that the particular type of topic model has been identified, and wherein selecting the first topic model and the second topic model comprises selecting a first instance of the particular type of topic model as the first topic model, and selecting a second instance of the particular type of topic model as the second topic model, which may be of the same or different type from the first one.

In some implementations, causing the first topic model to identify the first set of key terms and the second topic model to identify the second set of key terms comprises generating a plurality of instances of a first type of topic model, wherein the first topic model is an instance of the plurality of instances of the first type of topic model, and causing the plurality of instances, of the first type of topic model, to identify a plurality of sets of key terms associated with the first speaker transcript, wherein the first set of key terms is included in the plurality of sets of key terms.

In some implementations, causing the first topic model to identify the first set of key terms and the second topic model to identify the second set of key terms further comprises determining coherence values for the plurality of instances of the first type of topic model, wherein the coherence values indicate a measure of similarity between the plurality of sets of key terms and terms included in the first speaker transcript, and wherein the first set of key terms is identified based on the coherence value determined for the first topic model.

In some implementations, causing the first topic model to identify the first set of key terms and the second topic model to identify the second set of key terms comprises generating a plurality of instances of a second type of topic model, wherein the second type of topic model is different than the first type of topic model, and wherein the second topic model is an instance of the plurality of instances of the second type of topic model, and causing the plurality of instances, of the second type of topic model, to identify a plurality of sets of key terms associated with the second speaker transcript, wherein the second set of key terms is included in the plurality of sets of key terms associated with the second speaker transcript.

In some implementations, causing the first topic model to identify the first set of key terms and the second topic model to identify the second set of key terms further comprises determining coherence values for the plurality of instances of the second type of topic model, wherein the coherence values indicate a measure of similarity between the plurality of sets of key terms and terms included in the second speaker transcript, and wherein the second set of key terms is identified based on the coherence value determined for the second topic model.

In some implementations, the plurality of topic models include two or more of a latent semantic indexing model, a latent Dirichlet allocation model, or a hierarchical Dirichlet process model.

As further shown in FIG. 5, process 500 may include identifying a common set of key terms based on the first set of key terms and the second set of key terms (block 540). For example, the device may identify a common set of key terms based on the first set of key terms and the second set of key terms, as described above.

As further shown in FIG. 5, process 500 may include generating, based on the common set of key terms, a first transcript summary of the first speaker transcript and a second transcript summary of the second speaker transcript (block 545). For example, the device may generate, based on the common set of key terms, a first transcript summary of the first speaker transcript and a second transcript summary of the second speaker transcript, as described above.

The one or more topic models may comprise a plurality of topic models. The first set of key terms may be determined based on a first topic model of the plurality of topic models and the second set of key terms may be determined based on a second topic model, of the plurality of topic models that is different form the first topic model. The first set of key terms and the second set of key terms may be determined, according to the one or more topic models.

As further shown in FIG. 5, process 500 may include generating a conversation summary based on the first transcript summary and the second transcript summary (block 550). For example, the device may generate a conversation summary based on the first transcript summary and the second transcript summary, as described above.

In some implementations, generating the conversation summary comprises determining a first identifier of the first speaker, determining a second identifier of the second speaker, and combining the first transcript summary in association with the first identifier and the second transcript summary in association with the second identifier to form the conversation summary.

As further shown in FIG. 5, process 500 may include performing an action associated with the conversation summary (block 555). For example, the device may provide, to a user device, a message that includes either a portion of the conversation summary or the second speaker summary, as described above.

In some implementations, process 500 includes prior to providing the message, receiving a first identifier of the first speaker and a second identifier of the second speaker, obtaining an address of the user device based on at least one of the first identifier or the second identifier, wherein the message is provided to the user device based on the address.

In some implementations, process 500 includes storing, in a record data structure, the conversation summary in association with an identifier of the first speaker or the second speaker.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
identifying, by a device, a first section and a second section of a transcript of a conversation between a first speaker and a second speaker,
wherein the first section corresponds to speech of the first speaker and the second corresponds to speech of the second speaker;
separating, by the device, the first section and the second section to form a first speaker transcript associated with the first speaker and a second speaker transcript associated with the second speaker;
removing, by the device, a first set of delimiters in the first section and a second set of delimiters in the second section;
punctuating, by the device, the first speaker transcript;
punctuating, by the device, the second speaker transcript;
selecting, by the device and from a plurality of topic models, a first topic model to analyze the first speaker transcript and a second topic model to analyze the second speaker transcript;
causing, by the device, the first topic model to identify a first set of key terms associated with the first speaker transcript and the second topic model to identify a second set of key terms associated with the second speaker transcript;
identifying, by the device, a common set of key terms based on the first set of key terms and the second set of key terms;
generating, by the device and based on the common set of key terms, a first transcript summary of the first speaker transcript and a second transcript summary of the second speaker transcript;
generating, by the device, a conversation summary based on the first transcript summary and the second transcript summary; and
perform, by the device, an action associated with the conversation summary.

2. The method of claim 1, further comprising:
determining whether a particular type of topic model has been identified with respect to analyzing the first speaker transcript and the second speaker transcript; and
wherein selecting the first topic model and the second topic model comprises selecting the first topic model and the second topic model based on determining whether the particular type of topic model has been identified.

3. The method of claim 2, further comprising:
determining that the particular type of topic model has been identified; and
wherein selecting the first topic model and the second topic model comprises:
selecting a first instance of the particular type of topic model as the first topic model; and
selecting a second instance of the particular type of topic model as the second topic model.

4. The method of claim 1, wherein causing the first topic model to identify the first set of key terms and the second topic model to identify the second set of key terms comprises:
generating a plurality of instances of a first type of topic model,
wherein the first topic model is an instance of the plurality of instances of the first type of topic model; and
causing the plurality of instances, of the first type of topic model, to identify a plurality of sets of key terms associated with the first speaker transcript,
wherein the first set of key terms is included in the plurality of sets of key terms.

5. The method of claim 4, wherein causing the first topic model to identify the first set of key terms and the second topic model to identify the second set of key terms further comprises:
determining coherence values for the plurality of instances of the first type of topic model,
wherein the coherence values indicate a measure of similarity between the plurality of sets of key terms and terms included in the first speaker transcript, and
wherein the first set of key terms is identified based on the coherence value determined for the first topic model.

6. The method of claim 4, wherein causing the first topic model to identify the first set of key terms and the second topic model to identify the second set of key terms comprises:
generating a plurality of instances of a second type of topic model,
wherein the second type of topic model is different than the first type of topic model, and
wherein the second topic model is an instance of the plurality of instances of the second type of topic model; and
causing the plurality of instances, of the second type of topic model, to identify a plurality of sets of key terms associated with the second speaker transcript,
wherein the second set of key terms is included in the plurality of sets of key terms associated with the second speaker transcript.

7. The method of claim 1, wherein the plurality of topic models include two or more of:
a latent semantic indexing model;
a latent Dirichlet allocation model; or
a hierarchical Dirichlet process model.

8. A device, comprising:
one or more processors configured to:
analyze a transcript, of a conversation, to separate the transcript into:
a first section of the transcript that corresponds to a first speaker in the conversation, and
a second section of the transcript that corresponds to a second speaker in the conversation;
process, based on a set of delimiters included in the transcript, the first section and the second section to form a first speaker transcript associated with the first speaker and a second speaker transcript associated with the second speaker;
remove first delimiters, of the set of delimiters, and insert first punctuation marks in the first section;
remove second delimiters, of the set of delimiters, and insert second punctuation marks in the second section;

determine, based on one or more topic models, a first set of key terms associated with the first speaker transcript and a second set of key terms associated with the second speaker transcript;

generate, based on a common set of key terms associated with the first set of key terms and the second set of key terms, a first transcript summary of the first speaker transcript and a second transcript summary of the second speaker transcript;

generate a conversation summary based on the first transcript summary and the second transcript summary; and perform an action associated with the conversation summary.

9. The device of claim 8, wherein the one or more topic models include a first instance of a particular type of topic model and a second instance of the particular type of topic model; and wherein the one or more processors, when determining the first set of key terms associated with the first speaker transcript and the second set of key terms associated with the second speaker transcript, are configured to:

cause the first instance of the particular type of topic model to determine the first set of key terms; and cause the second instance of the particular type of topic model to determine the second set of key terms.

10. The device of claim 9, wherein the one or more processors are configured to:

determine a first value associated with a first number of topics to be determined by the first instance of the particular type of topic model, wherein the first set of key terms is determined based on the first number of topics; and determine a second value associated with a second number of topics to be determined by the second instance of the particular type of topic model, wherein the second set of key terms is determined based on the second number of topics.

11. The device of claim 10, wherein the one or more processors, when determining the first set of key terms associated with the first speaker transcript and the second set of key terms associated with the second speaker transcript, are configured to:

cause the first instance of the particular type of topic model to identify one or more first topics based on the first number of topics, wherein the one or more first topics are associated with one or more first sets of key terms, and wherein the one or more first sets of key terms include the first set of key terms; and cause the second instance of the particular type of topic model to identify one or more second topics based on the second number of topics, wherein the one or more second topics are associated with one or more second sets of key terms, and wherein the one or more second sets of key terms include the second set of key terms.

12. The device of claim 8, wherein the one or more processors, when determining the first set of key terms associated with the first speaker transcript and the second set of key terms associated with the second speaker transcript, are configured to:

generate a plurality of instances of a first type of topic model; and cause the plurality of instances, of the first type of topic model, to identify a plurality of sets of key terms associated with the first speaker transcript, wherein a first topic model, of the one or more topic models, is included in the plurality of instances of the first type of topic model, and wherein the first set of key terms is identified by the first topic model and is included in the plurality of sets of key terms.

13. The device of claim 12, wherein the one or more processors, when determining the first set of key terms associated with the first speaker transcript and the second set of key terms associated with the second speaker transcript, are configured to:

determine coherence values for the plurality of instances of the first type of topic model, wherein the coherence values indicate a measure of similarity between the plurality of sets of key terms and terms included in the first speaker transcript, and wherein the first set of key terms is identified based on the coherence value determined for the first topic model.

14. The device of claim 12, wherein the one or more processors, when determining the first set of key terms associated with the first speaker transcript and the second set of key terms associated with the second speaker transcript, are configured to:

generate a plurality of instances of a second type of topic model, wherein the second type of topic model is different than the first type of topic model; and cause the plurality of instances, of the second type of topic model, to identify a plurality of sets of key terms associated with the second speaker transcript, wherein a second topic model, of the one or more topic models, is included in the plurality of instances of the second type of topic model, and wherein the second set of key terms is identified by the second topic model and is included in the plurality of sets of key terms associated with the second speaker transcript.

15. The device of claim 14, wherein the one or more processors, when determining the first set of key terms associated with the first speaker transcript and the second set of key terms associated with the second speaker transcript, are configured to:

determine coherence values for the plurality of instances of the second type of topic model, wherein the coherence values indicate a measure of similarity between the plurality of sets of key terms and terms included in the second speaker transcript, and wherein the second set of key terms is identified based on the coherence value determined for the second topic model.

16. A non-transitory computer-readable medium storing a set of instructions, the set of instructions comprising:

one or more instructions that, when executed by one or more processors of a device, cause the device to:

determine, based on a transcript of a conversation or based on audio data associated with the transcript, a first section of the transcript that corresponds to a first speaker of the conversation and a second section of the transcript that corresponds to a second speaker of the conversation;

identify and remove a first set of delimiters in the first section;

identify and remove a second set of delimiters in the second section;
insert first punctuation marks in the first section;
insert second punctuation marks in the second section;
generate a first speaker transcript from the first section and a second speaker transcript from the second section;
determine, based on a first topic model, a first set of key terms associated with the first speaker transcript;
determine, based on a second topic model, a second set of key terms associated with the second speaker transcript;
generate, based on the first set of key terms and the second set of key terms, a first transcript summary of the first speaker transcript and a second transcript summary of the second speaker transcript;
generate a conversation summary based on the first transcript summary and the second transcript summary; and
perform an action associated with the conversation summary.

17. The non-transitory computer-readable medium of claim 16, wherein the first topic model is a first instance of a particular type of topic model and the second topic model is a second instance of the particular type of topic model;
wherein the one or more instructions, that cause the device to determine the first set of key terms associated with the first speaker transcript, cause the device to:
cause the first instance of the particular type of topic model to determine the first set of key terms; and
wherein the one or more instructions, that cause the device to determine the second set of key terms associated with the second speaker transcript, cause the device to:
cause the second instance of the particular type of topic model to determine the second set of key terms.

18. The non-transitory computer-readable medium of claim 17, wherein the one or more instructions further cause the device to:
determine a first value associated with a first number of topics to be determined by the first instance of the particular type of topic model
wherein the first set of key terms is determined based on the first number of topics; and
determine a second value associated with a second number of topics to be determined by the second instance of the particular type of topic model,
wherein the second set of key terms is determined based on the second number of topics.

19. The non-transitory computer-readable medium of claim 18, wherein the one or more instructions, that cause the device to determine the first set of key terms associated with the first speaker transcript, cause the device to:
determine, based on the first number of topics, one or more first sets of key terms associated with the first speaker transcript,
wherein the first set of key terms is included in the one or more first sets of key terms; and
wherein the one or more instructions, that cause the device to determine the second set of key terms associated with the second speaker transcript, cause the device to:
determine, based on the second number of topics, one or more second sets of key terms associated with the second speaker transcript,
wherein the second set of key terms is included in the one or more second sets of key terms.

20. The non-transitory computer-readable medium of claim 16, wherein the one or more instructions, that cause the device to determine the first set of key terms associated with the first speaker transcript, cause the device to:
generate a plurality of instances of a first type of topic model; and
cause the plurality of instances, of the first type of topic model, to identify a plurality of sets of key terms associated with the first speaker transcript,
wherein the first topic model is included in the plurality of instances of the first type of topic model, and
wherein the first set of key terms is included in the plurality of sets of key terms.

* * * * *